No. 615,691. Patented Dec. 13, 1898.
S. Z. DE FERRANTI.
METHOD OF MANUFACTURING ELECTRICAL CABLES.
(Application filed Dec. 28, 1897.)

(No Model.) 2 Sheets—Sheet 1.

Witnesses
Edwin Drew Bartlett
Frank James Ames

Inventor
Sebastian Ziani de Ferranti
per Herbert Sefton Jones
Attorney

THE NORRIS PETERS CO., PHOTO-LITHO., WASHINGTON, D. C.

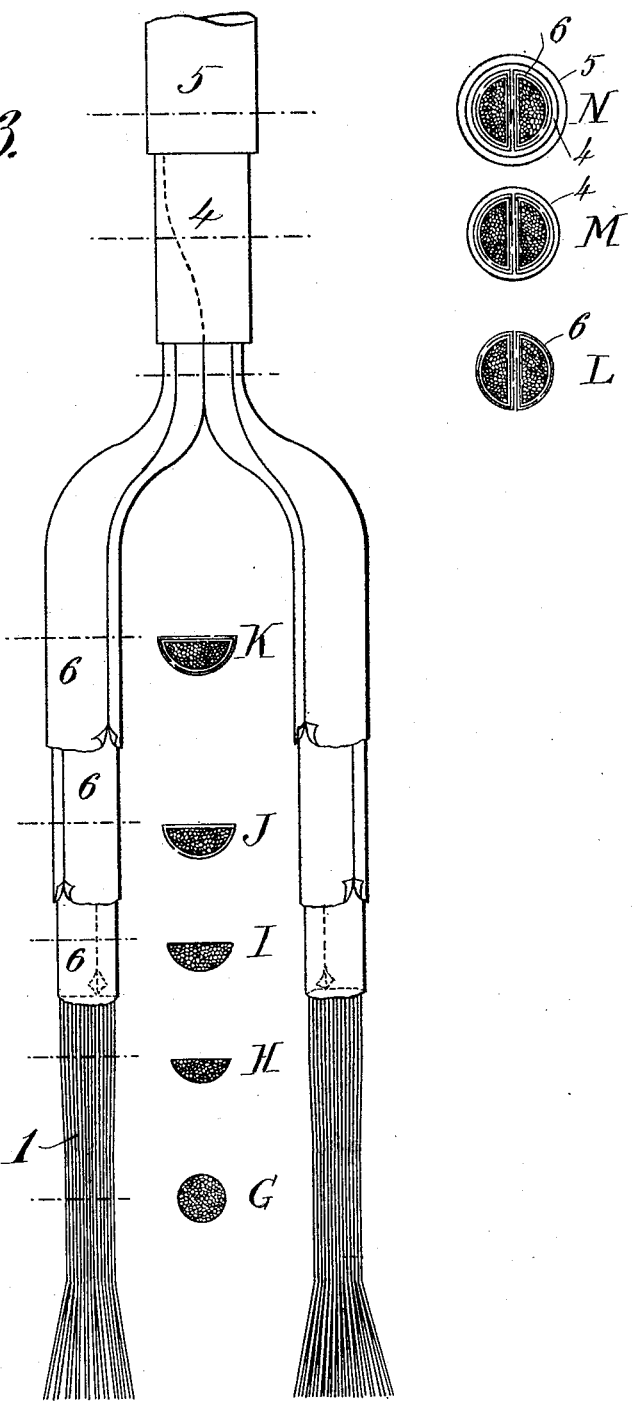

UNITED STATES PATENT OFFICE.

SEBASTIAN ZIANI DE FERRANTI, OF HOLLINWOOD, ENGLAND.

METHOD OF MANUFACTURING ELECTRICAL CABLES.

SPECIFICATION forming part of Letters Patent No. 615,691, dated December 13, 1898.

Application filed December 28, 1897. Serial No. 663,995. (No model.)

*To all whom it may concern:*

Be it known that I, SEBASTIAN ZIANI DE FERRANTI, electrical engineer, a subject of the Queen of Great Britain, residing at Hollinwood, in the county of Lancaster, England, have invented a new and useful Improvement in Methods of Manufacturing Electric Cables, (Case No. 2,) (for which I have obtained a patent in Great Britain, No. 3,363, dated the 9th day of February, 1897,) of which the following is a specification.

This invention has for its object an improved method of manufacturing electric cables of the kind or class described in the specification for improvement in electric cables filed on the same date as the present application, Serial No. 664,000.

According to my invention I construct electric cables containing two or more conductors, said conductors being insulated from each other and suitable for conveying currents for electric lighting or the distribution of electrical energy. The several conductors are shaped to form a portion of a circle in cross-section, so that when laid together with their insulation an approximately cylindrical cable is formed.

An essential feature of cables manufactured by my present invention is that the several conductors are made of separate strands of wires in intimate contact with each other, the area of the stranded wires being very little larger than the area of a solid conductor of the same current-carrying capacity.

In constructing a cable according to my invention I strand up copper wires in the usual way, so as to make a cylindrical conductor of approximately the same area as it is desired that the conductor shall eventually have when made up into a cable. I pass this cylindrical stranded conductor through rolls, which give it the desired shape. The shaped conductor is insulated with paper or other fibrous material in any suitable manner, preferably by laying strips of paper longitudinally along the conductor, two or more layers of such paper being arranged so as to break joint or the edges of the strips being arranged to overlap. Two or more such insulated conductors are placed together and insulated to form a cylindrical cable. The cable may finally be sheathed with lead or other protective material.

In order that my invention may be clearly understood, I will proceed to describe the same with reference to the accompanying drawings, in which—

Figure 1:
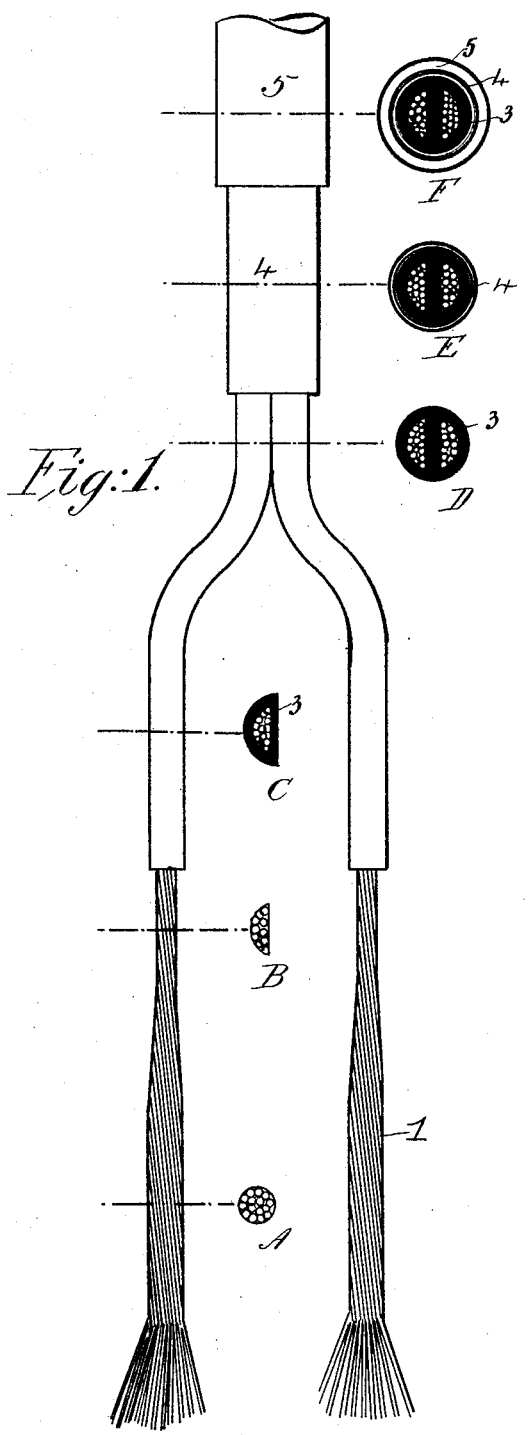
Figure 2:
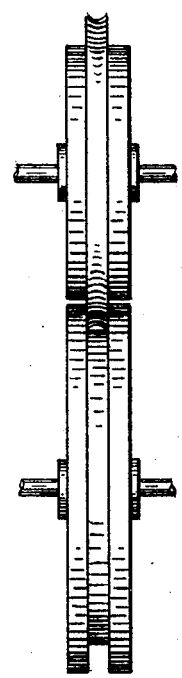

Figure 1 illustrates a cable in its various stages of manufacture, the section at different stages being shown by small figures A B C D E F, taken at the dotted lines opposite said figures. Fig. 2 shows a pair of rolls suitable for shaping a stranded conductor to a semicircular form in cross-section. Fig. 3 is a view similar to Fig. 1, illustrating a cable in which sheet insulation is applied to the conductor in strips laid longitudinally along the same, the section at different stages being shown by the small figures G, H, I, J, K, L, M, and N, taken at the dotted lines opposite thereto.

Referring now to Fig. 1, which illustrates the manufacture of a twin conductor-cable, 1 are the several strands composing the conductors. These are laid up by suitable machinery, well known to persons skilled in the art, to form a circular conductor, the cross-section of which is shown at A. The two such conductors are led through rolls, such as shown in Fig. 2, and deformed to the shape of a semicircle in cross-section, as shown at B. The separate wires composing each conductor are thereby pressed into intimate contact with each other, and the conductor is reduced in its gross area without reducing its current-carrying capacity and with little loss of flexibility. The two semicircular conductors are now insulated in any suitable manner—for example, by being wrapped with an insulating-tape, such as indicated at 3. After insulating the cross-section of each insulated conductor will be similar to that shown at C. The two insulated conductors are next laid together to form a cable, the cross-section of which is shown at D, and the whole insulated with another layer of insulation 4. The cross-section will now be as shown at E. A protecting-sheath, of lead or other suitable material 5, may then be placed around the insulated cable, the section of which is shown at F.

The various stages in the manufacture of my improved cable, as above described, are separately well known to cable-manufacturers.

In place of wrapping the paper or sheet insulation spirally round the conductor, as is the usual practice, I prefer to lay strips 6 of such insulation longitudinally along said conductor, as shown in Fig. 3, the edges of the strips being either butt-jointed, in which case the several layers are arranged to break joint, or being overlapped in order to insure thorough insulation.

The rolls for compressing the conductor to the desired shape are positively driven and of large diameter, and in some cases I rough them upon their surfaces, so as to give the necessary amount of drive to all parts of the conductor, which is passed through them. I prefer not to draw the conductor through the rolls, as there is a tendency for the wires to be displaced. The gate of the rolls is made of a section such as will compress the conductor into the shape required. In Fig. 2 the gate is shown as being semicircular; but when making cables having more than two separate conductors I so construct the rolls as to give the conductors the shape of a sector of a circle in cross-section.

What I claim is—

1. The method of manufacturing electric cables for electric light and power distribution which consists in first forming a circular stranded conductor passing the same between rolls to compress it to the shape of part of a circle in cross-section, insulating said conductor, and lastly laying a number of such conductors together to form an approximately cylindrical cable as set forth.

2. The method of manufacturing electric cables for electric light and power distribution which consists in first forming a circular stranded conductor, passing the same between rolls to compress it to the shape of a circle in cross-section, insulating said conductor, laying a number of such conductors together to form an approximately cylindrical cable, and lastly covering said cable with a leaden sheath as set forth.

3. The method of manufacturing electric cables for electric light and power distribution which consists in first forming a circular stranded conductor, compressing said conductor to the shape of a part of a circle in cross-section, insulating said conductor with strips of sheet insulation laid longitudinally along said conductor, and lastly laying a number of such conductors together to form an approximately cylindrical cable, as set forth.

4. The method of manufacturing electric cables for electric light and power distribution which consists in first forming a circular stranded conductor, compressing said conductor to the shape of a part of a circle in cross-section, insulating said conductor with strips of insulating-sheet laid longitudinally along the conductor, and arranged so that successive layers break joint, and lastly laying a number of such conductors together to form an approximately cylindrical cable as set forth.

5. The method of manufacturing electric cables for electric light and power distribution which consists in first forming a circular stranded conductor, compressing said conductor to the shape of a part of a circle in cross-section, insulating said conductor with strips of sheet insulation laid longitudinally along said conductor, and lastly laying a number of such conductors together spirally to form an approximately cylindrical cable, as set forth.

6. The method of manufacturing electric cables for electric light and power distribution which consists in first forming a circular stranded conductor, compressing said conductor to the shape of a part of a circle in cross-section, insulating said conductor with strips of sheet insulation laid longitudinally along said conductor, laying a number of such conductors together to form an approximately cylindrical cable, and lastly covering said cable with a sheath, as set forth.

In testimony whereof I have signed my name to this specification in the presence of two subscribing witnesses.

SEBASTIAN ZIANI DE FERRANTI.

Witnesses:
WILMER MATTHEWS HARRIS,
FREDERICK COWLEY HARRIS.